(12) United States Patent
Hill et al.

(10) Patent No.: US 9,392,346 B2
(45) Date of Patent: Jul. 12, 2016

(54) SYSTEM AND METHOD OF REMOTE DIAGNOSTICS

(75) Inventors: Donald John Hill, Brisbane (AU); Aleks Valdis Velde, Coorparoo (AU); Brendan Paul McCarthy, Highgate Hill (AU)

(73) Assignee: LEICA GEOSYSTEMS AG, Heerbrugg (CH)

( * ) Notice: Subject to any disclaimer, the term of this patent is extended or adjusted under 35 U.S.C. 154(b) by 1622 days.

(21) Appl. No.: 12/526,842

(22) PCT Filed: Sep. 7, 2007

(86) PCT No.: PCT/AU2007/001329
§ 371 (c)(1),
(2), (4) Date: Jan. 26, 2010

(87) PCT Pub. No.: WO2008/098281
PCT Pub. Date: Aug. 21, 2008

(65) Prior Publication Data
US 2010/0138102 A1    Jun. 3, 2010

Related U.S. Application Data

(63) Continuation of application No. 60/889,744, filed on Feb. 14, 2007.

(51) Int. Cl.
*G06F 7/00* (2006.01)
*H04Q 9/00* (2006.01)
(52) U.S. Cl.
CPC ........... *H04Q 9/00* (2013.01); *H04Q 2209/823* (2013.01)
(58) Field of Classification Search
CPC .............................. G01C 25/00; G01C 25/005
USPC ............................................................. 701/30
See application file for complete search history.

(56) References Cited

U.S. PATENT DOCUMENTS

| 6,330,499 | B1 | 12/2001 | Chou et al. |
| 6,611,740 | B2 | 8/2003 | Lowrey et al. |
| 7,092,803 | B2 | 8/2006 | Kapolka et al. |
| 2002/0133273 | A1 | 9/2002 | Lowrey et al. |
| 2004/0167689 | A1 | 8/2004 | Bromley et al. |

FOREIGN PATENT DOCUMENTS

GB        2366407 A    3/2002

OTHER PUBLICATIONS

Examination Report dated Jan. 21, 2010 as received in AU Application No. 2009101263.
Response to Examination Report dated Feb. 16, 2010 as filed in in AU Application No. 2009101263.

*Primary Examiner* — Mussa A Shaawat
*Assistant Examiner* — Kyung Kim
(74) *Attorney, Agent, or Firm* — Maschoff Brennan

(57) ABSTRACT

A system of remote diagnostics comprising a guidance device having a guidance device identifier, the guidance device further including a communication module for communicating a service request message, the service request message including the guidance device identifier; and a diagnostics module able to communicate with the communication module of the guidance device and configured to receive the service request message of the communication module of the guidance device, the diagnostics module maintaining a data store associating the guidance device identifier with a service provider entity; wherein, the diagnostics module is configured to facilitate communication between the service provider entity and the communication module of the guidance device in response to receipt of the service request message from the communication device of the guidance device and based upon the association of the guidance device identifier with the service provider entity.

14 Claims, 3 Drawing Sheets

2100
The diagnostics module 200 receives a service request message from the communication module 110 of the guidance device 100.

2200
The diagnostics module 200 identifies a service provider entity 300 associated with the guidance device 100.

2300
The diagnostics module 200 notifies the identical service provider entity 300 of the service request message.

2400
The diagnostics module 200 places the service provider entity in communication with the communication module 110 of the guidance device 100.

2500
The diagnostics module 200 facilitates communication between the communication module 110 of the guidance device 100 and the service provider entity 300.

FIG. 2

SYSTEM AND METHOD OF REMOTE DIAGNOSTICS

CROSS REFERENCE TO RELATED APPLICATIONS

The present application claims benefit under 35 U.S.C. §119(e) from a United States Provisional Patent Application of Hill, Donald John, et al. entitled "A System and Method of Remote Diagnostics", Ser. No. 60/889,774, filed on Feb. 14, 2007, the entire contents being incorporated herein by reference.

FIELD OF THE INVENTION

The present invention relates to a remote diagnostics system and method. In particular, although not exclusively, the present invention relates to a system and method for remotely diagnosing a vehicular guidance device.

BACKGROUND TO THE INVENTION

Off-road vehicles typically utilised in, for example, agricultural, construction, mining and forestry applications, such as tractors, harvesters, diggers, graders, dump trucks and other powered vehicles, commonly comprise electronic equipment designed to assist an operator in guiding the vehicle along a particular path.

In particular, agricultural vehicles, such as tractors, harvesters and the like, often include a guidance device that includes a Global Positioning System (GPS) unit and display to guide the vehicle along a predetermined path using positional data provided by the GPS constellation of satellites as an aide.

Moreover, it is known to use guidance devices that include GPS units on agricultural vehicles such that a course may be stored within the guidance device and the guidance device operates the vehicle in a semi-autonomous manner.

Alternatively, the guidance device provides direction to an operator of the agricultural vehicle to enable the operator to maintain a predetermined fixed path when, for example, harvesting crops with the vehicle.

However, like all high technology equipment, it is not uncommon for guidance devices that are utilised in agricultural vehicles to fail and, from the point of view of the user at least, without any apparent reason. As such, it is necessary to have a skilled technician travel to the site in order to diagnose and correct the fault in the guidance device.

Often these faults are transient and stem from situations such as communication errors between a base station guidance sub-module of the guidance device and an on-board guidance sub-module due to the terrain and obstructions between the sub-modules.

Given the often remote locations in which agricultural vehicles operate, a failure of the guidance device may result in a long period of down time whilst the technician travels to a site in order to diagnose and correct the fault.

Often, a fault with a guidance device on an agricultural vehicle is relatively simple for a skilled technician to correct and requires a relatively small amount of time on site compared with the relatively large amount of time required for the diagnostician/technician to travel to the site.

It is known in the art to remotely diagnose the performance of a vehicle. For example, U.S. Pat. No. 6,611,740 describes a system for monitoring a vehicle that includes a wireless appliance in electrical contact with an in-vehicle computer. The system described allows a remote diagnostician to interface with a computer on the vehicle to obtain data relating to the performance of the vehicle.

Furthermore, JP10-5427 describes a diagnostic tool for automobiles that notifies a nearby service station of a malfunction condition in relation to the performance of the vehicle.

Whilst the systems described above adequately provide for remote diagnostics of vehicles, remotely diagnosing a vehicle guidance device has a different set of problems that are not catered for by these prior art systems.

Hence, it is desirable to provide a system and method of remotely diagnosing a vehicular guidance module.

In this specification, the terms "comprises", "comprising", "includes", "including" or similar terms are intended to mean a non-exclusive inclusion, such that a method, system or apparatus that comprises a list of elements does not include those elements solely, but may well include other elements not listed.

SUMMARY OF THE INVENTION

In one form, although it need not be the broadest form, the invention resides in a system of remote diagnostics comprising a guidance device having a guidance device identifier, the guidance device further including a communication module for communicating a service request message, the service request message including the guidance device identifier; and a diagnostics module able to communicate with the communication module of the guidance device and configured to receive the service request message of the communication module of the guidance device, the diagnostics module maintaining a data store associating the guidance device identifier with a service provider entity; wherein, the diagnostics module is configured to facilitate communication between the service provider entity and the communication module of the guidance device in response to receipt of the service request message from the communication device of the guidance device and based upon the association of the guidance device identifier with the service provider entity.

Suitably, the diagnostics module facilitates communication between the service provider entity and the communication module of the guidance device by providing a web based interface to allow the service provider entity to receive and view performance data associated with the guidance device communicated to the diagnostics module.

Suitably, the service provider entity is configured to receive performance data associated with the guidance device from the communication module of the guidance device. Preferably, the diagnostics module is configured to display the performance data of the guidance device such that the service provider entity obtains a display identical to a display of the performance data provided by the guidance device.

Preferably, the performance data includes location data associated with the guidance device and the diagnostics module is in communication with a spatial data provider, the diagnostics module configured to retrieve image data from the spatial data provider based upon the location data.

Preferably, the service request message is communicated by a user of the guidance device by the user selecting a service request function displayed upon a display of the guidance device.

Suitably, the service provider entity is configured to communicate a configuration instruction message to the communication module of the guidance device to thereby alter the configuration of the guidance device.

Suitably, the guidance device may include a base station positioning sub-module and an on-board positioning sub-module. In this arrangement, the guidance device is implementing a differential Global Positioning System (GPS) method.

Preferably, the service request message includes a network address of the communication module of the guidance device.

In another form, although again not necessarily the broadest form, the invention resides in a method of remote diagnostics, the method including the steps of receiving a service request message from a communication module of a guidance device, the service request message including a guidance device identifier and a network address of the communication module of the guidance device; identifying a service provider entity based on the guidance device identifier; notifying the service provider entity of the service request message; placing the service provider entity in communication with the communication module of the guidance device utilizing the network address of the communication module of the guidance device; and facilitating communication of performance data associated with the guidance device from the communications module of the guidance device to the service provider entity, the performance data including location data associated with the guidance device.

Optionally, the method further includes the step of retrieving image data from a spatial-data provider based upon the location data; and communicating the image data to the service provider entity.

Preferably, the method further includes the step of displaying the performance data of the guidance device to the service provider entity such that the service provider entity obtains a display identical to a display of the performance data provided by the guidance device.

Suitably, the service request message is communicated by a user of the guidance device by the user selecting a service request function displayed on a display of the guidance device.

Preferably, the method further includes the step of communicating a configuration instruction message from the service provider entity to the communication module of the guidance device.

BRIEF DESCRIPTION OF THE DRAWINGS

By way of example only, preferred embodiments of the invention will be described more fully hereinafter with reference to the accompanying drawings, wherein:

FIG. 2 shows a method of remote diagnostics according to further embodiment of the invention.

DETAILED DESCRIPTION OF THE INVENTION

The invention will be described in the context of remotely diagnosing a guidance device of an agricultural vehicle. A skilled person will appreciate that the method and system of the invention may be similarly applied to diagnose guidance devices on all forms of vehicles from agricultural, mining and civil engineering applications, to off road recreational vehicles, cars and boats.

Figure 1:
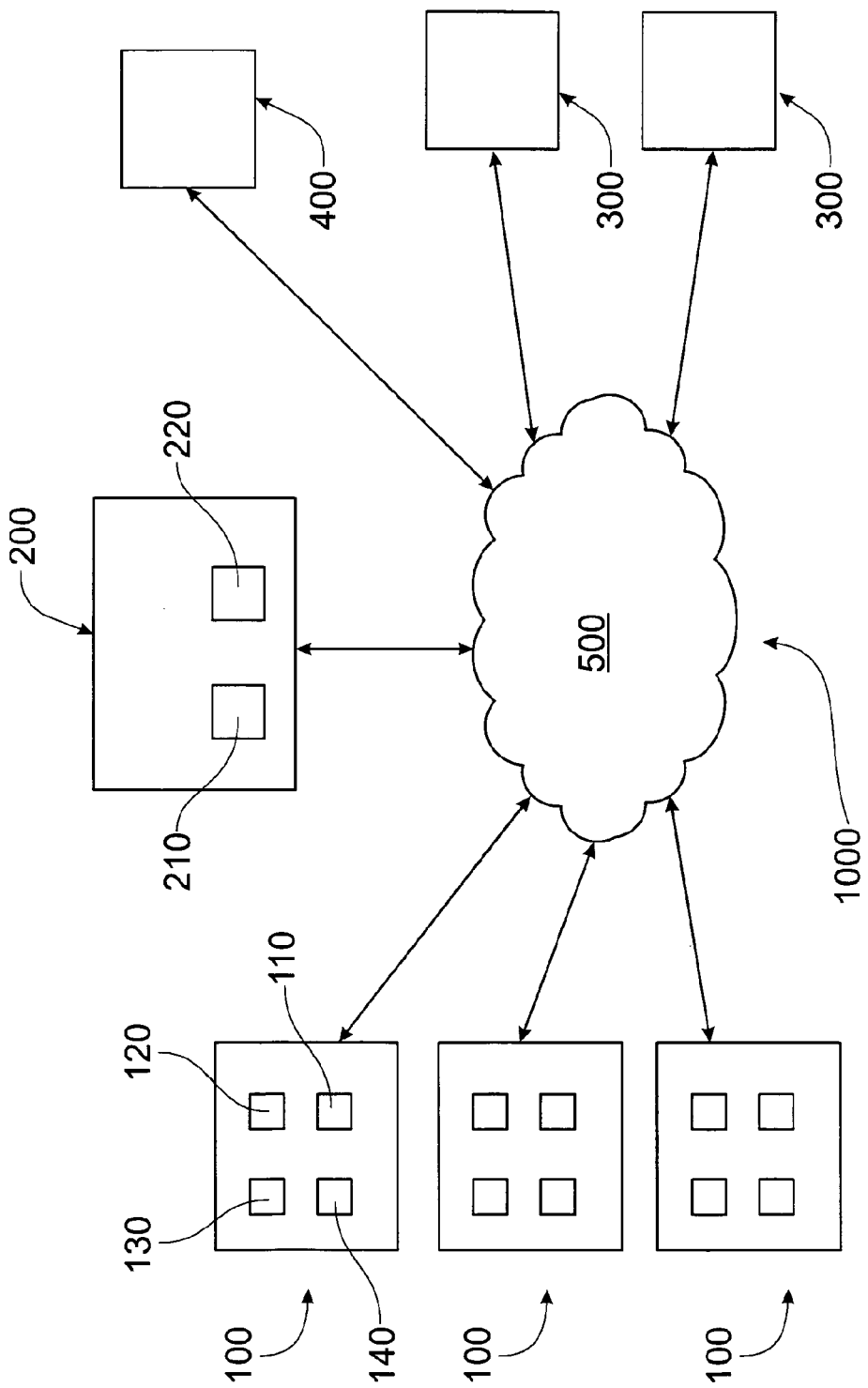
FIG. 1 shows a system of remote diagnostics according to an embodiment of the invention.

FIG. 1 shows a schematic view of a system 1000 of remote diagnostics according to an embodiment of the invention. System 1000 includes a plurality of guidance devices 100, a diagnostics module 200, a plurality of service provider entities 300 and a spatial data provider 400, all in communication with network 500.

Network 500 is preferably in the form of the Internet. A skilled person will appreciate that network 500 may be in the form of any telecommunications network.

Each guidance device 100 is located on a respective vehicle, such as a tractor or the like, and comprises a processor 120 for controlling the components, discussed below, of the guidance device 100. The processor 120 has a guidance device identifier stored therein to uniquely identify each guidance device 100.

Guidance device 100 further comprises a positioning module 130 coupled to the processor 120. The positioning module 130 is preferably in the form of a Global Positioning System unit (GPS unit) or other known positioning units able to obtain positioning data from satellites belonging to the GPS, the Global navigation Satellite System (GLONASS), and/or the Galileo satellite system.

Guidance device 100 further comprises a display unit 140 operatively coupled to the processor 120. The display unit 140 provides a user of the guidance device 100 with performance data relating to the guidance device 100 such as positional data received from the positioning module 130, for example, the current heading, desired heading, latitude, longitude, and other performance data relating to the guidance device 100 such as the signal strength of the positional satellites, number of satellites viewed, power level of the guidance device 100, whether hardware forming the guidance device 100 has been correctly configured and connected and similar such data.

Each guidance device 100 of the invention also comprises a communication module 110 coupled to processor 120 and able to communicate with network 500. Suitably, communication module 110 is in the form of a cellular network module able to communicate with communications network 500 utilizing GSM, HSDPA or CDMA communication systems. Preferably, communication module 110 is able to communicate with communications network 500 using the Wireless Application Protocol (WAP).

In a preferred form, the guidance device 100 also includes an interface module (not shown) to enable a user of the guidance device to interface with the guidance device 100 in order to issue instructions and the like.

The communication module 110 preferably includes a network address to uniquely identify the communication module 110 of the guidance device 100 when communication module 110 is in communication with communications network 500. Preferably, the network address may be in the form of a subscriber identity module (SIM) card or may be an IP address assigned to the communication module 110 when the communication module 110 initiates communication with network 500.

Optionally, the positioning module 130 of the guidance device 100 may be in the form of a base station positioning sub-module located in a fixed location in communication with an on-board positioning sub-module located upon the vehicle. In this arrangement, the positioning module 130 employs differential GPS whereby errors in the positioning data obtained from the satellite constellation are calculated by the base station positioning sub-module and communicated to the on-board positioning sub-module as is known in the art.

System 1000 further comprises a diagnostics module 200 in communication with network 500. Diagnostics module 200 comprises a data store 210 and an interface module 22Q in communication with data store 210. Data store 210 of diagnostics module 200 stores a plurality of guidance device identifiers in association with a relevant service provider entity 300.

Suitably, data store 210 of diagnostics module 200 maintains a list of guidance device identifiers stored in association with a service provider entity 300.

In a preferred form, the interface module 220 is in the form of an Internet interface to provide a web based interface to the diagnostics module 200.

Alternatively, the interface module 220 is in the form of an interface to facilitate communications with the diagnostics module 200 by way of proprietary software.

The function of diagnostics module 200 is discussed in greater detail below.

As discussed, system 1000 further comprises a plurality of service provider entities 300 in communication with network 500. Suitably, each service provider entity 300 is in the form of a computing device as is known in the art having communication capabilities and operable by a diagnostician responsible for diagnosing and solving errors with a respective guidance device 100 as will be discussed in greater details below.

Optionally, a spatial data provider 400 forms part of system 1000. Spatial data provider 400 provides image data in the form of satellite imagery and/or terrain information in response to a request message containing location data, such as latitude and longitude co-ordinates. There are many known, commercially available spatial data providers 400, such as Google™ Maps and other similar applications and spatial data provider 400 may be in the form of any of these known applications.

Alternatively, spatial data provider 400 may be in the form of a proprietary application able to communicate image data in the form of satellite imagery and/or terrain information in response to a request message containing location data, such as latitude and longitude co-ordinates.

The system 1000 of remote diagnostics functions to provide a means for a diagnostician/technician of a guidance device 100, located upon an agricultural vehicle or the like, to efficiently and effectively diagnose and/or correct faults occurring with the guidance device 100 whereby the diagnostician/technician is able to diagnose and/or correct these faults from a location remote from the guidance device.

FIG. 2 shows a method 2000 of remote diagnostics according to a further embodiment of the invention.

The method 2000 commences when a user of the guidance device 100 is in need of assistance from a diagnostician or technician skilled in the operation of the guidance device 100 due to a fault in the guidance 100 device or a perceived fault in the guidance device 100.

The user communicates a service request message from the communication module 110 of the guidance device 100 to the diagnostics module 200 and the diagnostics module 200 receives the service request message from the communication module 110 of the guidance device 100 (Step 2100).

The service request message includes the guidance device identifier stored in the processor 120 of the guidance device 100 and the network address of the communication module 110 of the guidance device 100 as will be discussed in greater detail below.

Optionally, the service request message also includes fault data supplied by the user of the guidance device 100 relating to details of the fault.

In a preferred form, the communication of the service request message is initiated by the user of the guidance device 100 by the user selecting a service request function displayed on the display unit 140 of the guidance device 100. This action triggers the communication module 110 of the guidance device 100 to communicate the service request message to the diagnostics module 200.

Preferably, the communication module 110 creates a connection with network 500 in the form of the Internet and communicates the service request message to the interface module 220 of the diagnostics module 200 via the Internet 500.

As such, the network address of the communication module 110 of the guidance device 100 is in the form of an Internet Protocol (IP) address assigned to the communication module 110 when the communication module establishes a connection with network 500.

As the IP address of the communication module 110 will differ each time a service request message is received, the diagnostics module 200 stores the network identifier of the communication module 110 for further communication.

Optionally, the service request message may be communicated to the diagnostics module 200 using Voice over IP (VOIP) or a telecommunications messaging protocol such as SMS or the like.

The diagnostics module 200 then identifies a service provider entity 300 associated with the guidance device 100 (Step 2200).

The diagnostics module 200 extracts the guidance device identifier form the service request message and queries data store 210 to determine the relevant service entity provider 300 responsible for diagnosing and correcting faults in the guidance device 100.

As mentioned, the data store 210 maintains a list of all guidance device identifiers and associates details of the relevant service entity provider 300 in association with each guidance device identifier.

As previously discussed, there may be a plurality of service provider entities with each service provider entity responsible for diagnosing and correcting faults in only a subset of all guidance devices 100 due to, for example, contractual reasons or due to a specific service provider entity 300 only begin capable of servicing a particular configuration of the guidance device 100 and not others.

The diagnostics module 200 then notifies the identified service provider entity 300 of the service request message (Step 2300).

Preferably, the data store 210 of the diagnostics module 200 also stores contact information associated with the identified service provider entity 300 and a notification method preferred by the identified service provider entity 300.

For example, the data store 210 of the diagnostics module 200 may contain an e-mail address associated with the identified service provider entity 300 and the diagnostics module 200 notifies the identified service provider entity 300 of the service request message received from the guidance device 100 by way of e-mail.

Optionally, the diagnostics module 200 may notify the identified service provider entity 300 of the service request message received from the guidance device 100 by communicating a text message to a designated cellular phone.

Alternatively, a call may be placed to the identified service provider entity 300.

The diagnostics module 200 then places the identified service provider entity 300 in communication with the communication module 110 of the guidance device 100 (Step 2400).

In a preferred form, this is carried out by the diagnostics module 200 commencing a new session in relation to the service request using the interface module 220 to provide a private dedicated web interface between the identified service provider entity 300 and the communications module 110 of the guidance device 100. The diagnostics module 200 utilizes the network address of the communications module 110 of the guidance device 100 to create this interface.

As such, the notification message discussed above with reference to step 2300 preferably includes a web address identifying the session created in the interface module. Preferably, the dedicated session also includes password authentication to enable the identified service provider entity 300 to be placed in communication with the communications module 110 of the guidance device 100 by the diagnostics module 200.

The diagnostics module 200 then facilitates communication between the communication module 110 of the guidance device 100 and the service provider entity 300 (step 2500).

In particular, the interface module 220 of the diagnostics module 200 receives performance data associated with the guidance device 100, as previously described, and communicates this performance data to the identified service provider entity 300 by way of the created session to enable diagnosis of the fault or perceived fault in the guidance device.

Figure 3:
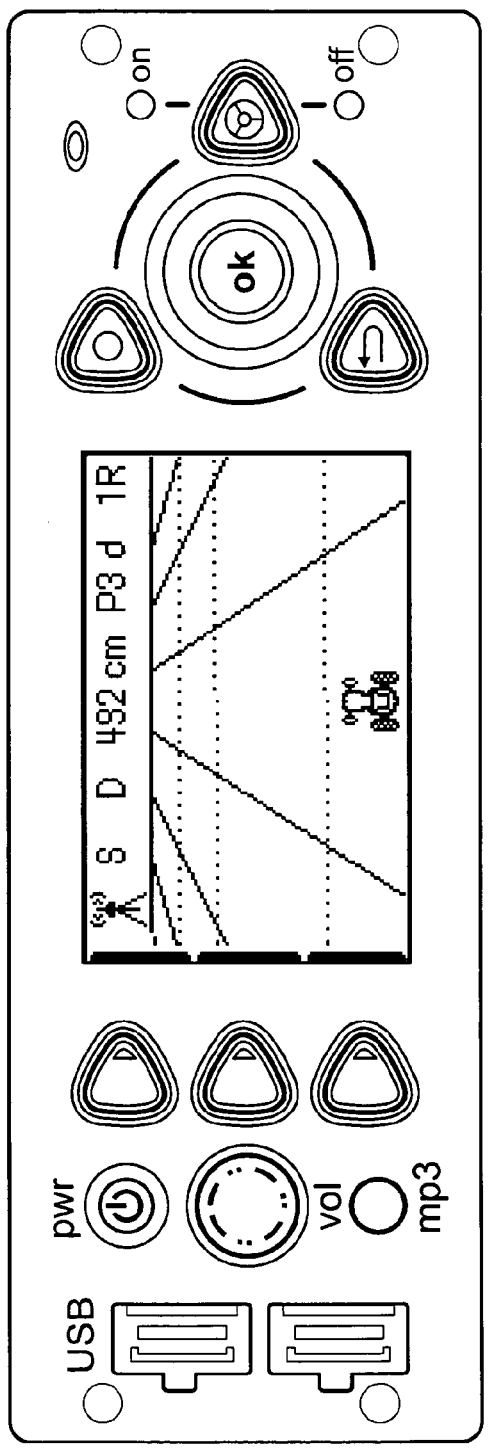
FIG. 3 shows an exemplary screen shot provided by an embodiment of the system and method of remote diagnostics.

In a preferred embodiment, the diagnostics module 200 is configured to display in the session via the interface module 220 the performance data of the guidance device 100 such that the identified service provider entity 300 receives a display identical to a display of the performance data provided by the guidance device 100 to the user of the guidance device 100. An exemplary display, according to an embodiment of the invention, provided to the identified service provider entity 300 is shown in FIG. 3.

Furthermore, the diagnostics module 200 is configured to facilitate communication of configuration instruction messages from the identified service provider entity 300 to the communication module 110 of the guidance device 100.

Preferably, the configuration messages include instruction data relating to reconfiguring the guidance module 100 in light of a fault diagnosed by the service provider entity 300. Optionally, the configuration messages may include textual data instructing a user of the guidance device to attempt tasks in an effort to trouble shoot the fault.

Additionally, the configuration message may be in the form of a firmware update message containing data to update the firmware operating on the processor 120 of the guidance device 100.

Optionally, the diagnostics module 200 is in communication with the spatial data provider 400 to retrieve image data from the spatial data provider 400 based upon location data received from the communication module 110 of the guidance device 100 as previously discussed. The interface module 220 of the diagnostics module 200 is configured to communicate the image data to the identified service provider entity 300 to help better diagnose the fault of the guidance device 100

For example, the positioning module 130 of the guidance device 100 may be located under a terrain based obstruction, such as a tree, and this obstruction may be interfering with the positioning calculations. As the identified service provider entity 300 is able to obtain the image data, in the form of spatial imagery and/or terrain information, in relation to the location of the guidance device 100, a diagnostician is able to actually view whether there are features of the terrain interfering with, for example, an antenna of the positioning module 130 of the guidance device 100.

In an embodiment of the invention, the performance data communicated by the guidance device 100 may also include data relating to the status of the guidance device, software configured to operate on the processor 120 of the guidance device 100, history data stored by the processor of the guidance device 100 in respect of paths taken by the vehicle upon which the guidance device 100 is located and the like, and performance data.

The system and method of remote diagnostics of the invention functions to provide a means for a diagnostician/technician of a guidance device 100, located upon an agricultural vehicle or the like, to efficiently and effectively diagnose and/or correct faults or perceived faults occurring with the guidance device 100 whereby the diagnostician/technician is able to diagnose and/or correct these faults or perceived faults from a location remote from the guidance device.

Furthermore, feature of the invention delivers information to the diagnostician that may otherwise not have been communicated to the diagnostician by the user of the guidance device.

Throughout the specification the aim has been to describe the present invention without limiting the invention to any one embodiment or specific collection of features. Persons skilled in the relevant art may realize variations from the specific embodiments that will nonetheless fall within the scope of the present invention.

The invention claimed is:

1. A system of remote diagnostics comprising: a guidance device having a guidance device identifier, the guidance device further including a communication module for communicating a service request message, the service request message including the guidance device identifier; and a diagnostics module able to communicate with the communication module of the guidance device and configured to receive the service request message of the communication module of the guidance device, the diagnostics module maintaining a data store associating the guidance device identifier with a service provider entity; wherein, the diagnostics module is configured to facilitate communication between the service provider entity and the communication module of the guidance device in response to receipt of the service request message from the communication device of the guidance device and based upon the association of the guidance device identifier with the service provider entity.

2. The system of remote diagnostics according to claim 1, wherein the diagnostics module facilitates communication between the service provider entity and the communication module of the guidance device by providing a web based interface to allow the service provider entity to receive and view performance data associated with the guidance device communicated to the diagnostics module.

3. The system of remote diagnostics according to claim 1, wherein the service provider entity is configured to receive performance data associated with the guidance device from the communication module of the guidance device.

4. The system of remote diagnostics according to claim 1, wherein the diagnostics module is configured to display the performance data of the guidance device such that the service provider entity obtains a display identical to a display of the performance data provided by the guidance device.

5. The system of remote diagnostics according to claim 2, wherein the performance data includes location data associated with the guidance device and the diagnostics module is in communication with a spatial data provider, the diagnostics module configured to retrieve image data from the spatial data provider based upon the location data.

6. The system of remote diagnostics according to claim 1, wherein the service request message is communicated by a user of the guidance device by the user selecting a service request function displayed upon a display of the guidance device.

7. The system of remote diagnostics according to claim 1, wherein the service provider entity is configured to communicate a configuration instruction message to the communication module of the guidance device to thereby alter the configuration of the guidance device.

8. The system of remote diagnostics according to claim 1, wherein the guidance device includes a base station positioning sub-module and an on-board positioning sub-module to thereby implement a differential positioning method.

9. The system of remote diagnostics according to claim 1, wherein the service request message includes a network address of the communication module of the guidance device.

10. A method of remote diagnostics, the method including the steps of: receiving a service request message from a communication module of a guidance device, the service request message including a guidance device identifier and a network address of the communication module of the guidance device; identifying a service provider entity based on the guidance device identifier; notifying the service provider entity of the service request message; placing the service provider entity in communication with the communication module of the guidance device utilizing the network address of the communication module of the guidance device; and facilitating communication of performance data associated with the guidance device from the communications module of the guidance device to the service provider entity, the performance data including location data associated with the guidance device.

11. The method of remote diagnostics according to claim 10 further including the steps of: retrieving image data from a spatial-data provider based upon the location data; and communicating the image data to the service provider entity.

12. The method of remote diagnostics according to claim 10 further including the step of: displaying the performance data of the guidance device to the service provider entity such that the service provider entity obtains a display identical to a display of the performance data provided by the guidance device.

13. The method of remote diagnostics according to claim 10, wherein the service request message is communicated by a user of the guidance device by the user selecting a service request function displayed on a display of the guidance device.

14. The method of remote diagnostics according to claim 10 further including the step of: communicating a configuration instruction message from the service provider entity to the communication module of the guidance device.

* * * * *